Sept. 4, 1951 H. P. FOLKER 2,566,444
PNEUMATIC TRAIN CONTROL VALVE
Filed Oct. 25, 1948 3 Sheets-Sheet 1
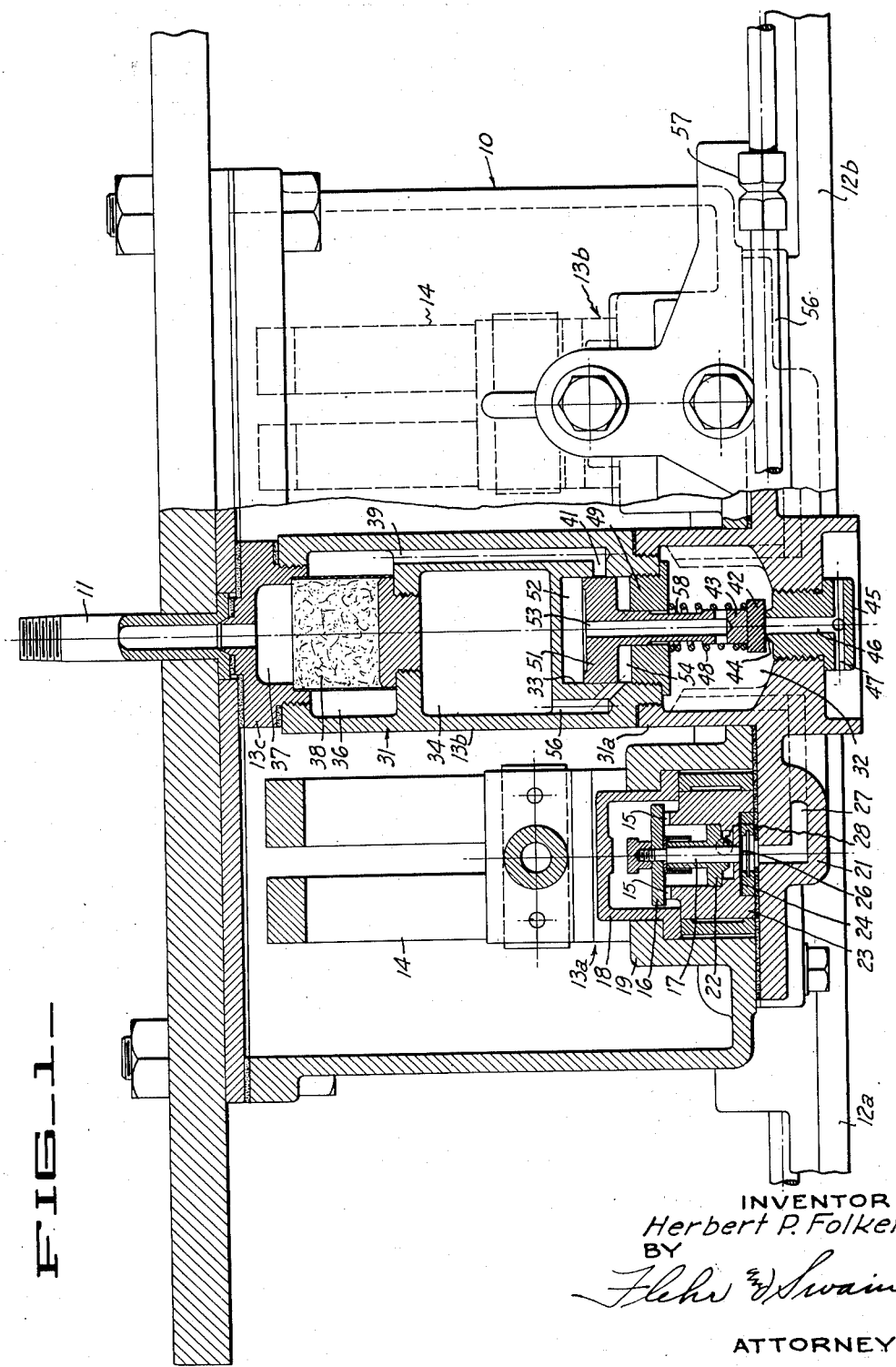
FIG_1
INVENTOR
Herbert P. Folker
BY
Flehr & Swain
ATTORNEYS

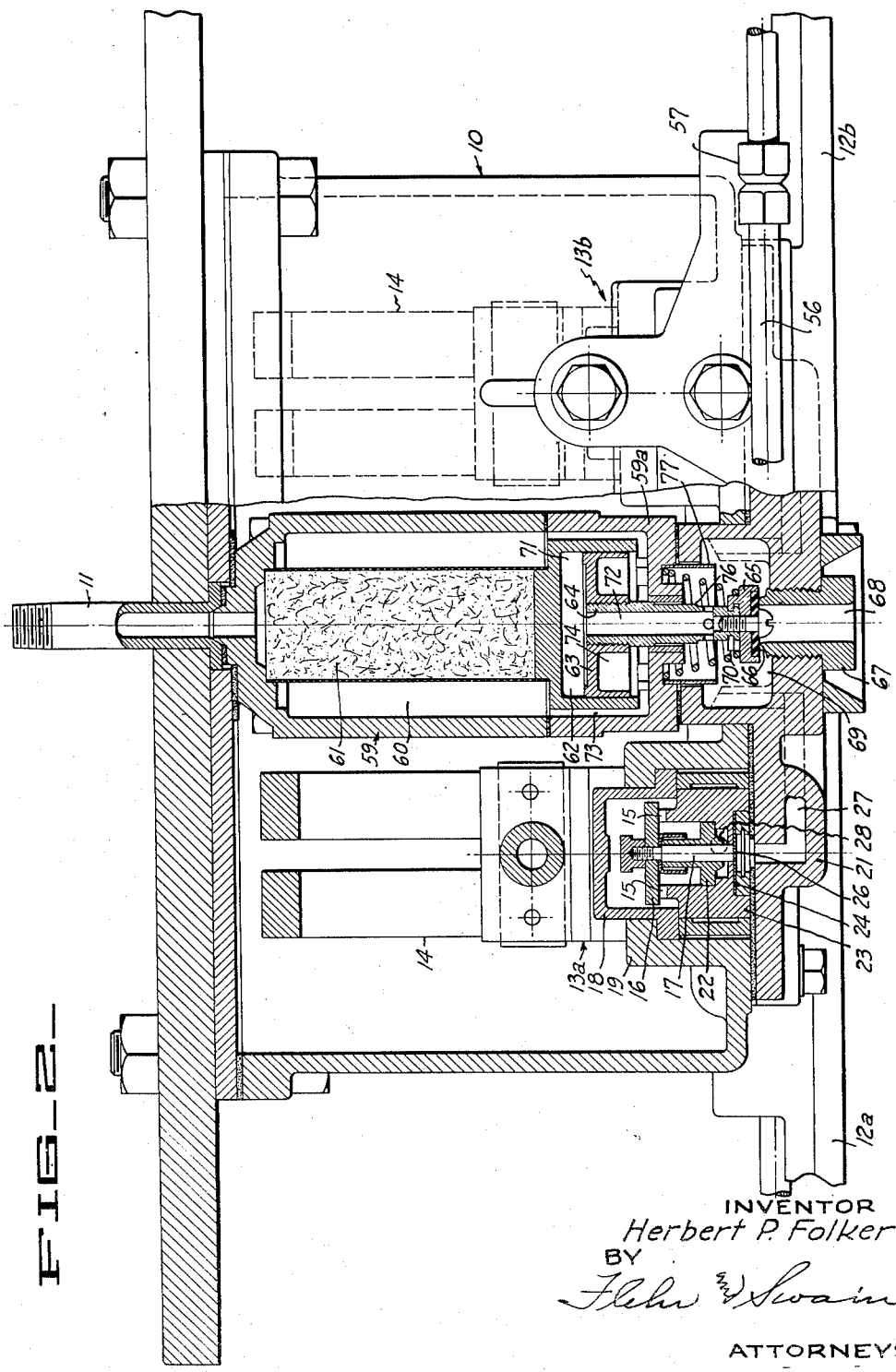

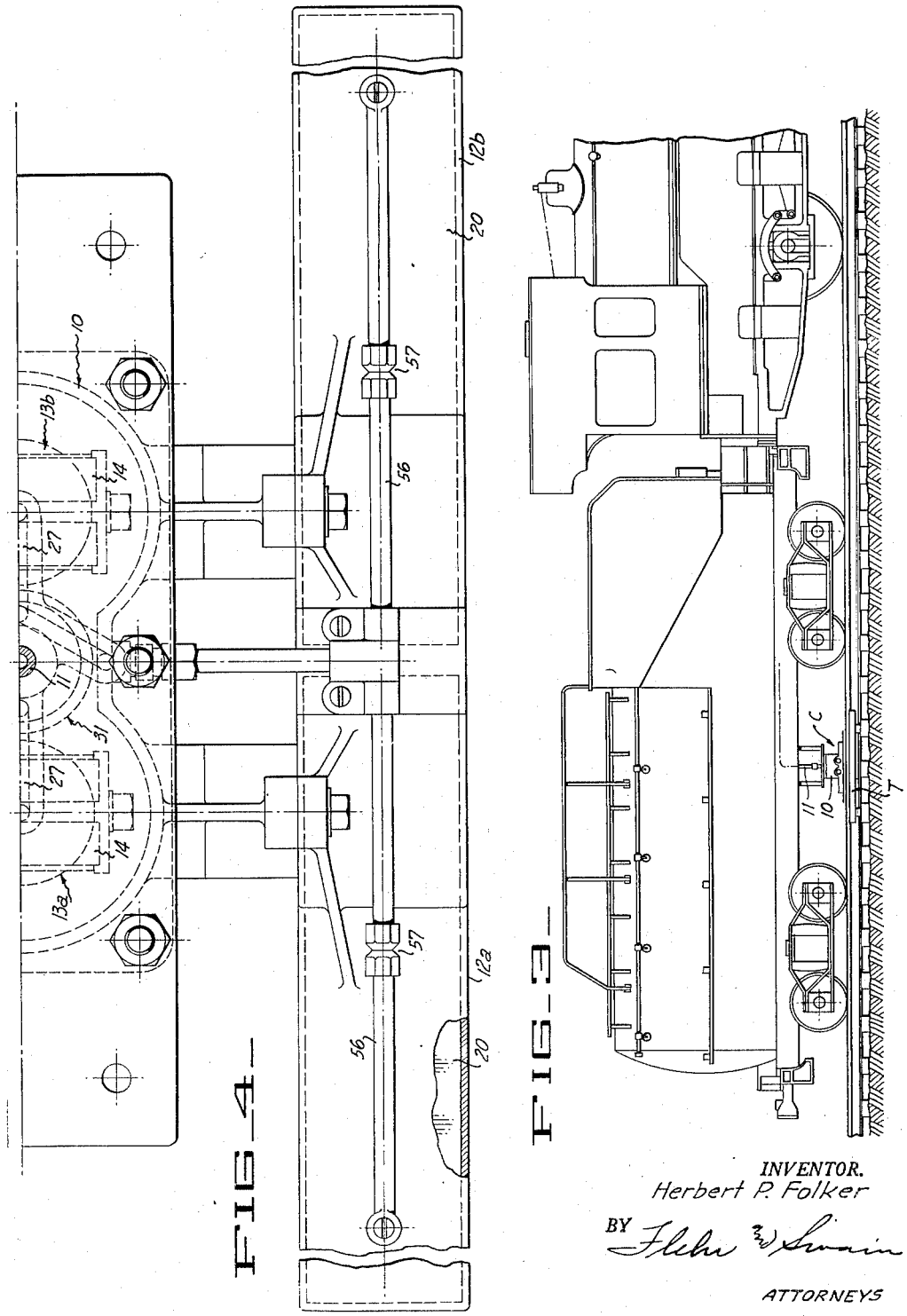

Patented Sept. 4, 1951

2,566,444

UNITED STATES PATENT OFFICE 2,566,444

PNEUMATIC TRAIN CONTROL VALVE

Herbert P. Folker, Oakland, Calif., assignor to National Safety Appliance Co., Ltd., San Francisco, Calif., a corporation of California Application October 25, 1948, Serial No. 56,430

8 Claims. (Cl. 246—190)

This invention relates generally to improvements in train control apparatus for use on railways. It pertains particularly to the construction of magnetically operated control valve units such as are utilized in conjunction with automatic brake applying systems of railways, and which are operated by a magnetic track impulse.

In the past automatic brake control systems for railways have made use of valve control units adapted to be operated by a magnetic track impulse, and serving to cause automatic operation of the pneumatic braking system. In many instances the arrangement is such that if the train passes through a block signal a magnetic impulse causes operation of a control valve, with the result that a pneumatic brake control line is vented to cause automatic application of the train brakes. Thereafter it is necessary to restore the system by operation of a manual resetting valve. Systems and apparatus of this character are disclosed for example in Folker 1,548,593. In other systems automatic operation may be used to control the speed of the train, as by causing an automatic brake application in the event the train exceeds a given maximum speed through a restricted zone.

In operating the control valves of such systems a problem is involved in connection with condensate. Condensate may interfere with proper operation, particularly during the winter months when freezing is apt to occur. For this reason condensate chambers have been provided in conjunction with the control unit, and provision is made, such as a removable vent plug, for periodic draining of the condensate chamber. It will be evident that this occasions considerable labor and expense, aside from the fact any failure to properly service may result in a failure in operation of the system.

It is an object of the present invention to provide a control unit for systems of the above character which will function automatically to drain out condensate. As will be presently explained this is accomplished by use of an additional relay vent valve which is operated automatically, and which serves to discharge condensate from the condensate chamber upon each actuation of the control valve.

Further objects of the invention will appear from the following description in which the preferred embodiment has been set forth in detail in conjunction with the accompanying drawing.

Referring to the drawing:

Figure 1 is a side elevational view partly in section illustrating a pneumatic train control valve incorporating the present invention.

Figure 2 is a view like Figure 1 but showing a simplified embodiment of the invention.

Figure 3 is a fragmentary side elevational view showing my control unit installed in a tender.

Figure 4 is a half plan view of the control unit.

The magnetically operated valve control unit C illustrated in the drawing (Figure 3) is in many respects similar to the unit C disclosed in said Patent 1,548,593. It consists of a closed body or housing 10 adapted to be carried below a train car, tender or locomotive. Pipe 11 connects with a brake control line of a train braking system, and corresponds to the pipe H shown in Figure 2 of Patent 1,548,593. Generally this pipe connects through a manually operated reset valve to a so-called pneumatic stop valve inserted in the brake system. Normally pressure is carried in pipe 11, and at the stop valve end of the pipe it is continuously connected to the pressure system through a restricted orifice. Venting of pipe 11 to the atmosphere to reduce the pressure within the same to a predetermined degree causes an automatic brake application. The valve control unit C is adapted to pass over and be operated by the track magnet unit T.

The lower portion of the housing 10 carries two pairs 12a, 12b of elongated housings, which serve to enclose the so-called laminated inductor strips 20 (see strips 24, Figures 2 and 3 of Patent 1,548,593). Within housing 10 are the two control valves 13a and 13b. Two such valves are used in duplex arrangement to secure operation for either direction of movement of the train, as described in the above-mentioned patent.

Each control valve includes permanent magnets 14 having their pole pieces 15 magnetically associated with the armature 16 and also magnetically associated with laminated extensions (28 of Patent 1,548,593) of the laminated inductor strips. This armature in turn is attached to the upper end of the valve stem 17. The inductor strips are magnetically associated with the pole pieces 15 and armature 16 in such a manner that a magnetic track impulse received by one set of inductor strips serves to neutralize the effect of the permanent magnet 14 upon the armature, thus permitting the armature to move upwardly for open position of the valve. The parts just described are suitably enclosed within elements including the cap 18, the annular body part 19 formed integral with the side walls of the main housing, and the bottom closure plate 21 of the main housing. In addition the stem is suitably guided as by means of guide bushing 22, which is mounted within the inner body part 23. A leather disc 24 is provided with a central aperture or orifice 26, and forms a stationary valve working surface cooperating with the end face of the valve stem 17. The lower face of this disc forms the inflow side of the control valve and is connected to the duct 27. When the stem 17 is raised to permit flow through the orifice 26 fluid is received in the outflow chamber 28 which is freely vented to the atmosphere.

The other control valve 13b is formed in the same manner as valve 13a, except that the polarity of the permanent magnets is reversed.

The relay vent valve is interposed between the two control valves. Thus between the valves there is a multipart structure designated generally at 31, the lower part 31a of which provides a condensate chamber 32. Above the condensate chamber there is a cylinder 33, and above the cylinder a relief capacity chamber 34 and a filter chamber 36. The cylinder together with the two chambers just described can be formed in a common part 31. The top part 31 is formed to provide an inlet chamber 37 in free communication with pipe 11. Condensate chamber 32 has its upper portion in unrestricted communication with duct 27, as indicated schematically by dotted lines.

Within the chamber 36 there is a suitable air filter 38 which can be one of the hair type, having its core surrounded by a screen. The chamber 36 surrounding the filter communicates by duct 39 to a port 41 located within the walls of cylinder 33, and intermediate the ends of the same.

The lower part 31a of the structure 31 encloses the working parts of the relay vent valve. This valve includes the movable member 42 which can be in the form of a composition disc, attached to the lower end of the stem 43. The valve member cooperates with a stationary seat 44 formed upon the upper end of the removable body plug 45. Ducts 46 and 47 in the plug connect the valve orifice to the atmosphere. The valve stem is surrounded by a compression spring 48 which acts downwardly, thus normally urging the vent valve toward closed position.

The valve stem 43 extends slidably through the partition wall 49, and has its upper end attached to the piston 51. Space 52 above this piston has unrestricted communication with the condensate chamber 32 through the duct 53 which extends downwardly through the valve stem. In addition this chamber normally has restricted communication with the port 41 and duct 39, by virtue of clearance between the loose fitting piston and the walls of the cylinder.

The closed space 54 below the piston likewise has restricted communication about the piston with the port 41 and duct 39, and in addition it has unrestricted communication through duct 56 with the relief capacity chamber 34.

Space 54 below the piston 51 likewise has some restricted communication about the stem to the condensate chamber. Provision is made for providing increased communication direction with the condensate chamber, when the piston 51 moves upwardly. For this purpose the stem is provided with two or more flattened areas 58 which provide restricted ducts alongside the stem to establish communication between space 54 and the condensate chamber, when the piston is in its uppermost position.

It is desirable to provide the train control valve with closed pipes 56, which are connected to ducts 27, and which include the safety couplings 57, as shown in Folker 1,548,593.

Operation of the control unit described above can now be explained as follows: Assuming that it is connected with automatic train braking equipment in the manner disclosed in said Patent 1,548,593, the individual control valves 13a, 13b are normally closed and are retained closed by the magnetic fields of the permanent magnet. The relay vent valve is likewise normally closed and equal fluid pressures are applied to both sides of the piston. Over a period of time during which the unit is not operated considerable condensate may collect in the chamber 32. Assuming now that the control valve 13a receives a magnetic track impulse by passing over the track magnet T, the magnetic flux upon the armature 16 is momentarily neutralized thus permitting this armature together with the valve stem 17 to be forced upwardly by virtue of fluid pressure on the inflow side in duct 27. This immediately causes duct 27 to be vented to the atmosphere with the result that pressure in this duct and also in the condensate chamber is rapidly reduced. Pressure in the space 52 above the piston is likewise rapidly reduced because of the free communication of this space through duct 53 with the condensate chamber 32. As a result considerable differential pressure is applied to the piston tending to force the same upwardly. The chamber 34 furnishes considerable capacity to insure full movement of the piston upwardly. Such movement of piston 51 causes full opening of the vent valve member 42, with the result that condensate and air in chamber 32 are delivered to the atmosphere through the body plug 45, and a brake application occurs because of drop of pressure in pipe 11. Opening of the vent valve also depletes the air that flows to the magnetic valves thus permitting the magnet valve to reseat. The movement of the piston upwardly uncovers a part of port 41 so that thereafter and until resetting there is a continual venting of air through duct 39, space 54, the ducts formed by the flattened areas 58, and the condensate chamber. Piston 51 is held upwardly because the continual blow-through of air causes the pressure in space 54 to be greater than in space 52, thus causing the piston to be urged upwardly by the resulting differential force. This serves to insure a continual blow-through of air during the period following actuation and before resetting.

To reset the control valve unit the engineer or other operator operates suitable parts of the system, such as the previously mentioned resetting valve, whereby further bleeding of air from the brake system into line 11 is temporarily interrupted. This causes pressure in space 54 below the piston to drop to atmospheric, with the result that the piston moves downwardly by gravity and under the urge of compression spring 48, to close the relay vent valve. Upon reconnecting the line 11 with the system the pressure is restored to normal, and the unit is in condition for further actuation. Restoring the pressure causes like pressures to be applied above and below the piston, because of the restricted communication of spaces 52 and 54 with duct 39 through port 41. Likewise the pressure in the condensate chamber and the release capacity chamber 34 is restored.

Breakage of pipes 56 or couplings 57 likewise vents the ducts 27 to cause a brake application in the same manner as by opening of valve 13a or 13b.

Figure 2 illustrates another embodiment of the invention in which the filter chamber 36 and the capacity chamber 34 have been consolidated as one chamber space, and the operating means for the relay vent valve has been simplified. Thus in this instance the structure 59, corresponding to the structure 31 of Figure 1, is formed to provide a single chamber or space 60, which takes the place of both spaces 34 and 36 of Figure 1. The upper end of chamber 60 connects with the pipe 11, and this chamber serves to enclose the air filter element 61. The lower separable section or part 59a of structure 59 is provided with a closed cylinder 62, which is fitted with the piston 63. A hollow or tubular stem 64 connects the piston 63 with the valve member 65. The stationary seat 66 for the valve member 65 is formed on the plug or fitting 67, which is provided with the atmospheric vent passage 68. Chamber 69, which surrounds the valve member 65, forms a condensate chamber corresponding to chamber 32 of Figure 1. A compression spring 70 urges the valve member 65 toward closed position.

The closed space 71 above the piston 63 is in communication with the condensate chamber 69 through the passage 72 provided in the stem 64. Ducts 73 establish unrestricted communication between the chamber 60 and the space 74 below the piston 63. The lower portion 76 of the stem 64 is fluted as illustrated, whereby when the piston 63 is in its upper limiting position, there is relatively unrestricted communication between the chambers 60 and 69, about the stem 64. For the lowermost limiting position of the piston 63 illustrated in Figure 2, there is restricted communication between chambers 60 and 69, through the clearance about the stem 64. A baffle or deflecting ring 77 serves to deflect air jetting against the same from the lower end of duct 72, downwardly, thus preventing any direct jetting into ducts 27.

Operation of the embodiment illustrated in Figure 2 is substantially the same as the device of Figure 1. Assuming that the control valve 13a receives a magnetic track impulse, and is thus opened, duct 27 is vented to the atmosphere with the result that the pressure in the condensate chamber 69 is rapidly reduced. Pressure in the space 71 above the piston 63 is thus likewise rapidly reduced, because of its free communication with the condensate chamber through the passage 72. Thus considerable differential pressure is applied to the piston tending to force the same upwardly. Chamber 60 furnishes considerable capacity to insure full movement of the piston upwardly, in addition to serving to house the air filter 61. Upward movement of piston 63 causes full opening of the vent valve member 65, with the result that condensate and air in chamber 69 are delivered to the atmosphere through the body plug or fitting 67. At the same time opening of the vent valve depletes the air flowing through the open magnetic valve, thus permitting the magnetic valve to close or reseat itself. Movement of the piston 63 upwardly also serves to establish communication about the connecting tube 64 through the flutes 76, so that a sufficient blowdown occurs from the chamber 60 and pipe 11 to insure application and maintenance of a brake application.

This application is a continuation-in-part of my co-pending application Serial No. 670,670, filed May 18, 1946, now abandoned.

I claim:

1. In a pneumatic train control valve unit of the type adapted to cooperate with stationary track magnets to effect venting of a pneumatic line to thereby cause operation of the train brakes, a normally closed control valve adapted to be opened by a magnetic track impulse, the outflow side of the valve venting to the atmosphere, means forming a condensate collecting chamber, the chamber having the upper portion of the same in communication with the inflow side of the control valve, a relay vent valve arranged to vent the lower portion of the condensate chamber to the atmosphere upon opening the same, and means for effecting automatic operation of said relay vent valve upon opening of said control valve.

2. In a pneumatic train control valve unit of the type adapted to cooperate with stationary track magnets to effect venting of a pneumatic brake line to thereby cause operation of the train brakes, a normally closed control valve adapted to be opened by a magnetic track impulse, the outflow side of the valve venting to the atmosphere, a condensate collecting chamber having the upper portion of the same in fluid communication with the inflow side of the control valve, a relay valve arranged to vent the lower portion of the condensate chamber to the atmosphere upon opening the same, and pneumatic operating means for said relay vent valve having a fluid communication with both the brake line and the condensate chamber, said operating means serving to open the relay valve responsive to a fall in pressure in the condensate chamber effected by opening of said control valve, said relay valve also serving to vent the brake line through said condensate chamber.

3. In a pneumatic train control valve unit of the type adapted to cooperate with stationary track magnets to effect venting of a pneumatic brake line to thereby cause operation of the train brakes, a normally closed control valve adapted to be operated by a magnetic track impulse, the outflow side of the valve venting to the atmosphere upon opening the same, a condensate collecting chamber located adjacent the control valve, the chamber having an upper portion of the same in fluid connection with the inflow side of the control valve, a relay valve arranged to vent the lower portion of the condensate chamber to the atmosphere upon opening of the same, and pneumatic operating means for said relay valve, said operating means comprising a cylinder and a piston operating within the same, both sides of the piston normally having communication with the brake line, the space on one side of the piston having free communication with the inflow side of the control valve and restricted communication with the brake line whereby upon opening of the control valve the piston is moved by pressure upon its other side in a direction to open the relay vent valve, said venting valve when moved to open position also serving to vent the brake line through the condensate chamber.

4. A train control valve unit as in claim 3 in which the relay vent valve is urged toward closed position whereby it is automatically reset upon interrupting supply of air from the brake line.

5. A train control valve unit as in claim 3 in which a closed air supply chamber is provided and is in continuous communication with the space on said other side of the piston.

6. In a pneumatic train control valve unit of the type adapted to cooperate with stationary track magnets to effect venting of a pneumatic brake line to thereby cause operation of the train brakes, a control valve normally retained in closed position by a magnetic field and adapted to be opened by magnetic track impulse, the outflow side of the valve venting to the atmosphere, a condensate chamber having fluid communication with the inflow side of the control valve, a relay valve arranged to vent the condensate chamber to the atmosphere upon opening the same, and pneumatic operating means for said relay vent valve having a fluid communication with both the brake line and the condensate chamber, said operating means serving to open the relay valve responsive to a fall in pressure in the condensate chamber effected by opening of said control valve, said relay valve serving when opened to vent the brake line through said condensate chamber and to effect automatic closure of said control valve.

7. A train control valve unit as in claim 6 in which the operating means for the vent valve consists of a cylinder and a piston slidably fitted therein, the piston being connected to the vent valve, the fluid space on one side of the piston having unrestricted communication with the condensate chamber, the fluid space on the other side of the piston having communication with the brake line.

8. A train control valve as in claim 6 together with an air capacity chamber in communication with the brake line, and in which the operating means for the vent valve consists of a cylinder and a piston fitted therein, the piston being connected to the vent valve, the fluid space on that side of the piston remote from the vent valve having unrestricted communication with the condensate chamber and the space on the other side of the piston having communication with the air capacity chamber, said condensate chamber being in flow restricting communication with the brake line and said capacity chamber when the vent valve is in open venting position.

HERBERT P. FOLKER.

REFERENCES CITED

The following references are of record in the file of this patent:

UNITED STATES PATENTS

| Number | Name | Date |
|---|---|---|
| 937,839 | Morel | Oct. 26, 1909 |
| 1,548,593 | Folker | Aug. 4, 1925 |